United States Patent [19]

Kraft

[11] Patent Number: 4,884,772
[45] Date of Patent: Dec. 5, 1989

[54] CANTILEVERED VORTEX CONTROL DEVICE

[75] Inventor: Kurt R. Kraft, Seattle, Wash.

[73] Assignee: The Boeing Company, Seattle, Wash.

[21] Appl. No.: 889,663

[22] Filed: Jul. 28, 1986

[51] Int. Cl.⁴ .............................................. B64C 23/06
[52] U.S. Cl. .................................... 244/199; 244/130; 244/53 R
[58] Field of Search .................... 244/130, 199, 53 R, 244/198; 296/1 S

[56] References Cited

U.S. PATENT DOCUMENTS

| | | | |
|---|---|---|---|
| 3,744,745 | 7/1973 | Kerker | 244/41 |
| 4,378,922 | 4/1983 | Pierce | 244/199 |
| 4,466,587 | 8/1984 | Dusa | 244/121 |
| 4,489,905 | 12/1984 | Bengelink | 244/130 |
| 4,540,143 | 9/1985 | Wang | 244/130 |

FOREIGN PATENT DOCUMENTS

| | | | |
|---|---|---|---|
| 595877 | 4/1960 | Canada . | |
| 0082487 | 5/1985 | Japan | 296/1 S |
| 82488 | 5/1985 | Japan | 296/1 S |

*Primary Examiner*—Galen Barefoot
*Attorney, Agent, or Firm*—Thomas W. Hennen

[57] ABSTRACT

A vortex control device is designed for installation on the exterior surface of an aircraft nacelle in a position which does not compromise the optimum aerodynamic performance of the vortex control device. Existing cowling structure is bridged by this vortex control device which attaches only to movable structure and which is cantilevered over adjacent stationary structure. A resilient seal prevents air from swirling under the cantilevered portion, thus contributing to vortex generating efficiency and reduced aerodynamic drag.

9 Claims, 2 Drawing Sheets

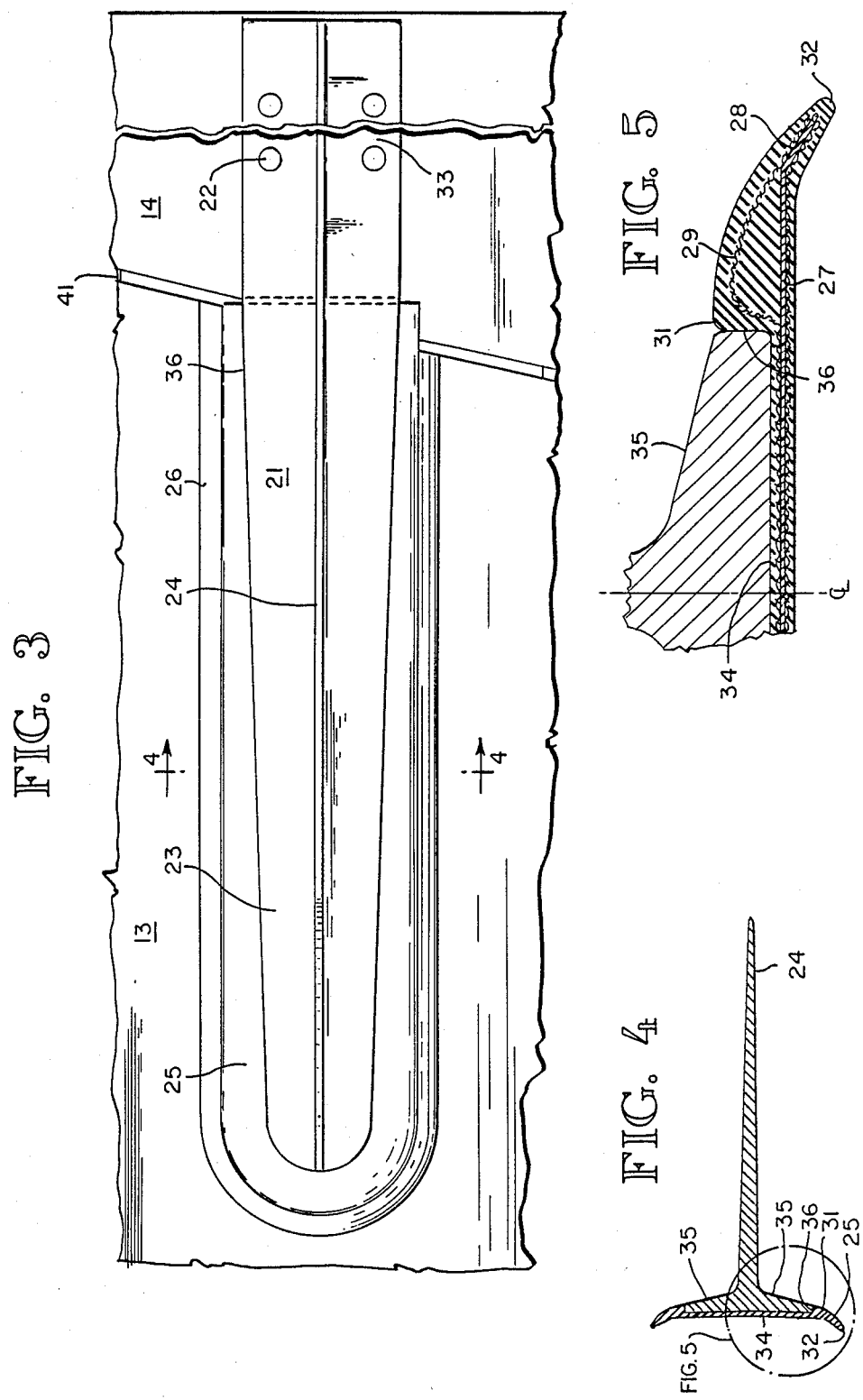

CANTILEVERED VORTEX CONTROL DEVICE

The Government has rights in this invention pursuant to Contract N00019-83-C-0176 awarded by the Navy Department.

BACKGROUND OF THE INVENTION

1. Field of the Invention

This invention pertains generally to the field of aerodynamic surfaces on aircraft structure. With greater particularity, this invention pertains to a vortex control device for use on the exterior of an aircraft. With greatest particularity, this invention pertains to a vortex control device which mounts to movable cowling structure and extends cantilevered over adjacent stationary cowling structure so that a single continuous aerodynamic surface is presented to the air flow in an optimum position.

2. Description of the Related Art

Devices to lower the stall speed of aircraft to thereby improve aircraft aerodynamic performance are known in the art. For example, vortex control devices which have been mounted to aircraft engine nacelles to aerodynamically interact with airflow around the wing have been used to lower aircraft stall speed, thereby enabling lower landing speeds and safer short field operations. U.S. Pat. No. 4,540,143 to Wang et al., commonly assigned with the present invention and incorporated by reference herein, describes one such wake or vortex control device. This device is mounted to the exterior surface of an aircraft engine nacelle below and forward of the leading edge of the wing. The wake control device generates a vortex which sweeps back and over the top of the wing to control air flow, resulting in a lower aircraft stall speed which enables lower landing speeds and thereby increases the safety and short field performance of the aircraft.

When such devices are mounted in their aerodynamically optimum position, they must often bridge movable cowling structure such as cowl doors and nonmovable or stationary cowling structure on the nacelle. This has required that the wake control device be manufactured in two or more segments so that each can be separately mounted to the nacelle. Dividing the wake control device into two or more segments to achieve optimum positioning on the nacelle surface requires precision alignment of the two segments in order to maximize the beneficial effect, and introduces aerodynamic inefficiency at the gap between segments.

In the past, if the placement of the vortex control device was across a movable joint such as between the inlet fan cowl and the fan cowl thrust reverser for example, the vortex control device would be split at the joint and attached to each cowling piece separately, or the vortex control device would be moved to a non-optimum position to avoid the joint or the vortex control device would be reduced in size to avoid the joint. Splitting the vortex control device causes alignment problems, reduces efficiency and increases drag. Moving or reducing the size of the vortex control device causes a reduction in effectiveness of the vortex control device since now it is no longer optimized. The installed position and size of the vortex control device is critical to ensure proper air flow over the wing and proper positioning of the vortex which this device generates.

SUMMARY OF THE INVENTION

The problems experienced with prior vortex or wake control devices caused by the need to alter the position or size of the device, or to divide it into two or more segments in order to avoid existing nacelle structure, has been eliminated by the present invention which enables optimum size and position of the vortex control device regardless of existing adjacent movable and stationary cowling structure.

The present invention cantilevers the vortex control device from movable cowling structure over stationary cowling structure so that optimum size and placement of the device may be retained while the function of the cowling structure is not impaired. The vortex control device of the present invention is characterized by an elongated base surmounted by a perpendicularly oriented vortex generating and controlling fin. The base defines at least two distinct zones. One zone may be termed the fastener zone in which holes penetrate the base for the insertion of mechanical fasteners used to secure the vortex control device to movable cowl structure, while a second zone, termed the cantilever zone, extends beyond the edge of the movable cowl structure and extends over the adjacent stationary cowling structure. By attaching the vortex control device to movable cowling structure, the movable function of the cowling structure is not impaired since as the structure is moved the vortex control device moves with it and away from the stationary cowling structure.

An air seal is provided under the cantilever zone of the vortex control device to seal against the adjacent stationary cowling structure to prevent air flow between the cantilever zone and the cowling structure which would reduce the efficiency of the device.

Accordingly, one object of the present invention is to achieve an uncompromised vortex control device which may be mounted to existing cowling structure. Another object is to provide a vortex control device which does not interfere with existing movable cowling function. Yet another object is to maximize efficiency and effectiveness of the cantilever mounted vortex control device. Additional objects and advantages of the present invention will be appreciated when reference is made to the detailed description which follows, taken in combination with the appended drawing figures.

BRIEF DESCRIPTION OF THE DRAWING

A better understanding of the present invention may be obtained by referring to the appended drawing figures wherein:

FIG. 3 illustrates a plan view of the cantilever zone of a vortex control device according to the invention.

FIG. 4 illustrates a section through FIG. 3 of a vortex control device.

Finally, FIG. 5 illustrates the construction of the resilient seal which is attached to the cantilever zone of the vortex control device.

DETAILED DESCRIPTION OF THE PREFERRED EMBODIMENT

Figure 1:
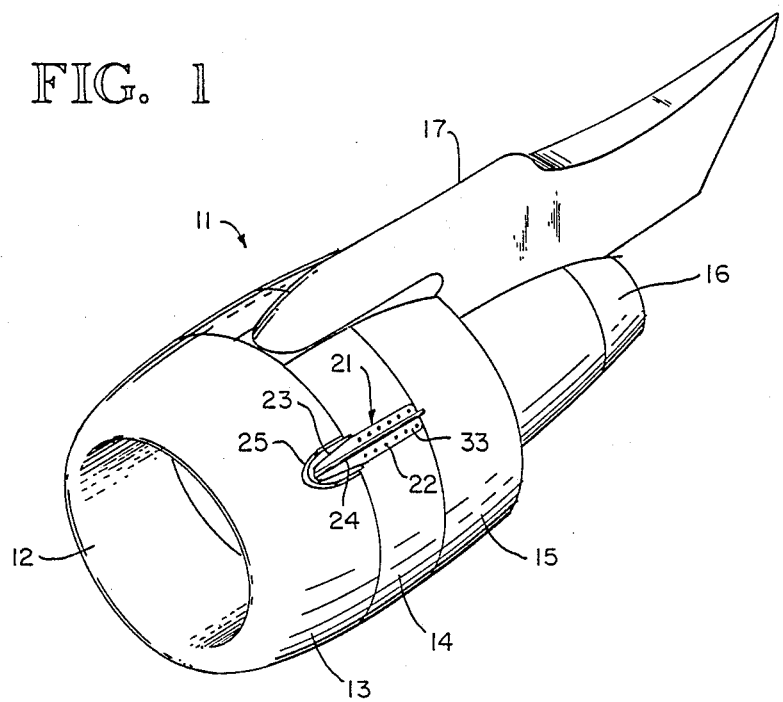
FIG. 1 illustrates a perspective view of an aircraft engine nacelle having a vortex control device according to the present invention.
Figure 2:
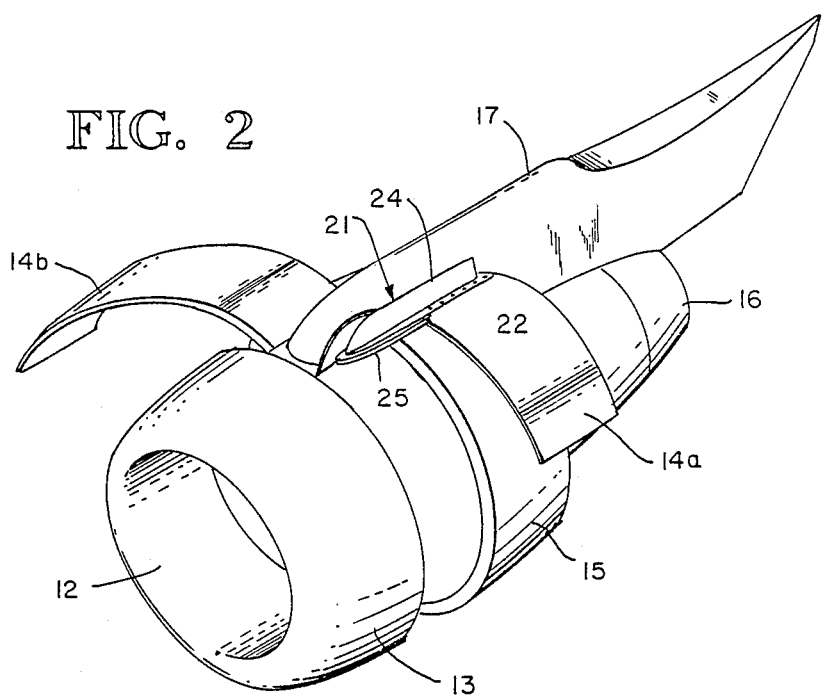
FIG. 2 illustrates an aircraft engine nacelle wherein cowling structure is shown in an open position.

Referring now to the drawing figures wherein like reference characters refer to like parts and elements throughout the several figures, and referring in particular to FIG. 1, there is shown an aircraft turbofan engine assembly 11 having an inlet 12 for passage of air to a turbofan engine. Inlet duct 13 has an outer surface which provides a smooth aerodynamic surface for flow of air. Fan cowl door 14 is faired to continue the smooth aerodynamic surface, but is movable to an open position for maintenance access as shown in FIG. 2 as 14a or its counterpart on the opposite side 14b. Aft from fan cowl door 14 is reverser fan duct cowl door 15 which continues the aerodynamic fairing. At the rear of turbofan engine assembly 11 is exhaust nozzle 16. Turbofan engine assembly 11 is mounted to an aircraft wing by means of strut 17.

Vortex control device 21 is shown in an optimized position, attached by means of fasteners 22 in fastener zone 33 to fan cowl door 14. Vortex control device 21 is shown extending forward in cantilever zone 23 over inlet duct 13. Of course, cantilever zone 23 could extend aft over adjacent cowling structure as well. Resilient seal 25 is shown sealing air from flowing between cantilever zone 23 and inlet duct 13. FIG. 1 illustrates the position of fin 24 which serves to generate and control a vortex. Because cantilever zone 23 is not rigidly supported by underlying structure, base portion 35 is thickened slightly over the conventional vortex control device to achieve the required stiffness. In addition, the bottom of the base portion in the cantilever zone 23 is relieved slightly to allow room for mounting the seal 25. Further details on the design and function of a vortex control device may be obtained by examining U.S. Pat. No. 4,540,143, incorporated by reference herein.

Referring now to FIG. 3, the installed vortex control device is shown attached by mechanical fasteners 22 to fan cowl door 14. Resilient seal 25 is shown extending the full length of cantilever zone 23. Rub strip 26, which is adhesively bonded to inlet duct 13, serves as a receiving surface for resilient seal 25 Section 4—4 is illustrated in FIG. 4 and shows sill 31 of seal 25 which abuts the edge 36 of base portion 35 in cantilever zone 23 to provide a continuous aerodynamically faired surface. Adhesive bond line 34 attaches seal 25 to the bottom of base portion 35 in cantilever zone 23. Any compatible adhesive could be utilized in bond line 34, provided it possesses sufficient tensile strength and resistance to factors such a temperature, and humidity prevalent in the environment of use.

The internal construction of resilient seal 25 is illustrated in FIG. 5 as a sectional view which represents a symmetrical half of seal 25 taken parallel to section line 4—4 of FIG. 3. FIG. 5 illustrates the position of sill 31 and shows internal stiffener 27. Stiffener 27 may be constructed of a conventional glass fiber and resin composite material. Stiffener 27 is bounded on each side and around the front end by downwardly projecting edge 28 which provides stiffness to lip 32 as it presses against rub strip 26 on inlet duct 13. Sill 31 and lip 32 as well as the rest of seal 25 exterior structural shape is formed in elastomeric material such as synthetic rubber or other suitable material. Cloth reinforcement 29 may be included in seal 25 during the molding process to enhance the strength and useful life of seal 25. Lip 32 seals against rub strip 26 on inlet duct cowling 13 to prevent airflow between base portion 35 in cantilever zone 23 and inlet duct 13.

If air were allowed to flow between base portion 35 in cantilever zone 23 and inlet duct 13, the efficiency of the present vortex control device would be impaired because the flow of air underneath cantilever zone 23 would detract from the generation of a vortex required to achieve the function of a vortex control device. In addition, aerodynamic drag of the device would be increased marginally. Finally, any vibration of cantilever zone 23 which might otherwise occur is damped by seal 25 although vortex control device 21 is dimensioned and constructed of materials possessing sufficient strength and stiffness that damaging vibration does not occur at any condition anticipated in normal operation. Thus seal 25 performs important functions in optimizing the performance of the present invention.

A vortex control device according to the present invention may advantageously be constructed of aircraft grade and alloy aluminum as is well known in the art. Other structural materials commonly used in aircraft construction could be substituted. Additionally, seal 25 could be constructed of any suitable resilient material such as synthetic rubber or other synthetic polymer having sufficient tensile strength and resistance to abrasion and wear, as would be dictated by conventional engineering practice. Although the best mode of attaching seal 25 to base portion 35 currently contemplated involves use of adhesive, mechanical fasteners could be utilized as well.

Having thus described the preferred embodiment of the present invention it is to be understood that other modifications and variations will readily occur to those skilled in the art and it is to be understood that these deviations from the illustrated embodiment are to be considered as part of the invention as claimed.

I claim:

1. A vortex control device for cantilevered mounting to the exterior surface of an aircraft nacelle in a position cantilevered forward into the air flow and bridging movable and stationary cowling structure, comprising:
   an elongated base portion which is conformal to said nacelle exterior surface, said base portion defining a fastener zone at the aft end forming a plurality of holes for use in attaching said vortex control device to cowling structure and a cantilever zone at the forward end for cantilevered extension over adjacent cowling structure;
   a fin coextensive and integral with said base portion and oriented substantially perpendicular to said base portion; and
   a resilient seal attached to said base portion in said cantilever zone for sealing between said vortex control device and said adjacent cowling structure.

2. A vortex control device as set forth in claim 1 wherein said resilient seal comprises;
   a glass fiber and resin composite stiffener having a flat, elongated body bounded on each side by projecting edges which angle away from said base portion of said vortex control device; and
   an elastomer material covering said stiffener and defining a raised sill abutting the sides of said base portion.

3. A vortex control device as set forth in claim 2 wherein said resilient seal further comprises an embedded fabric reinforcing said elastomeric material.

4. A vortex control device as set forth in claim 2 wherein said resilient seal further comprises said elastomeric material covering said stiffener projecting edges, defining resilient side lips for sealing against cowling structure.

5. A vortex control device as set forth in claim 2 further comprising adhesive attaching said resilient seal to said base portion.

6. A vortex control device as set forth in claim 2 further comprising mechanical fasteners attaching said resilient seal to said base portion.

7. A continuous, unitary vortex control device for cantilevered mounting to the exterior surface of an aircraft nacelle in a position cantilevered forward into the air flow and bridging movable and stationary cowling structure, comprising:

a thickened elongated base portion defining an upper surface and a lower surface which is conformal to said nacelle exterior surface, and defining a fastener zone at the aft end forming a plurality of holes penetrating said base portion through said upper and lower surfaces, and a cantilever zone at the forward end where said base portion is solid;

an elongated fin integral with said base portion along said upper surface and oriented substantially perpendicular to said base portion; and a resilient seal attached to said lower surface in said cantilever zone for sealing between said base portion and said cowling structure.

8. In combination, an aircraft engine nacelle having contoured movable and stationary cowling structure, and a continuous, unitary vortex control device cantilever mounted to the exterior surface of said nacelle in a position cantilevered forward into the air flow and bridging said movable and stationary cowling structure, said vortex control device comprising:

a thickened, elongated base portion defining an upper surface and a lower surface which is conformal to said nacelle exterior surface, and defining a fastener zone at the aft end forming a plurality of holes penetrating said base portion through said upper and lower surfaces, and a cantilever zone at the forward end where said base portion is solid;

an elongated fin integral with said base portion along said upper surface and oriented substantially perpendicular to said base portion;

a resilient seal attached to said lower surface in said cantilever zone for sealing between said base portion in said cantilever zone and said cowling structure; and a plurality of fasteners received in said base portion fastener zone holes and rigidly joining said base portion to said nacelle.

9. The combination of an aircraft engine nacelle and a continuous, unitary vortex control device as set forth in claim 8 wherein said base portion is mounted to a cowl door.

* * * * *